United States Patent
Yaqub et al.

(10) Patent No.: US 11,790,330 B1
(45) Date of Patent: *Oct. 17, 2023

(54) APPARATUSES AND METHODS FOR GENERATING A UNIFIED DIGITAL CHECK REGISTER

(71) Applicant: Wells Fargo Bank, N.A., San Francisco, CA (US)

(72) Inventors: Raziq Yaqub, Stewartsville, NJ (US); Andrew J. Garner, IV, State Road, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/928,065

(22) Filed: Jul. 14, 2020

Related U.S. Application Data

(63) Continuation of application No. 15/898,403, filed on Feb. 16, 2018, now Pat. No. 10,748,122.

(51) Int. Cl.
  *G06Q 20/04* (2012.01)
  *G06Q 40/12* (2023.01)
(52) U.S. Cl.
  CPC ......... *G06Q 20/042* (2013.01); *G06Q 40/128* (2013.12)
(58) Field of Classification Search
  CPC ......... G06Q 20/04; G06Q 20/40; G06Q 40/00
  USPC .............................................. 705/35, 39, 44
  See application file for complete search history.

(56) References Cited

U.S. PATENT DOCUMENTS

| | | | |
|---|---|---|---|
| 5,233,547 A | 8/1993 | Kapp et al. | |
| 5,258,935 A | 11/1993 | Ure | |
| 9,171,296 B1 | 10/2015 | Kurian | |
| 9,230,282 B2 | 1/2016 | Narendra et al. | |
| 10,748,122 B1 | 8/2020 | Yaqub et al. | |
| 11,521,184 B1 | 12/2022 | Yaqub et al. | |

(Continued)

OTHER PUBLICATIONS

Yerak, Becky. "New wave of banking: Check deposit via smartphone photo." [retrieved Nov. 9, 2017]. Retrieved from the Internet: <URL: https://phys.org/print198954885.html>. (dated Jul. 21, 2010) 3 pages.

(Continued)

*Primary Examiner* — Olusegun Goyea
(74) *Attorney, Agent, or Firm* — SCHWEGMAN LUNDBERG & WOESSNER, P.A.

(57) ABSTRACT

An apparatus, method, and computer program product for generating a unified digital check register are provided. An example method includes receiving, by input/output circuitry, check data and determining, by check evaluation circuitry, whether the received check data corresponds to a digital check or a physical check. In response to determining that the received check data corresponds to a digital check, the method includes generating digital check data based on the received check data. In response to determining that the received check data corresponds to a physical check the method includes generating physical check data based on the received check data. The method further includes inserting, by registry management circuitry, any generated digital check data with any generated physical check data into a unified check dataset, and curating, by the registry management circuitry, a unified digital check register using the unified check dataset.

19 Claims, 6 Drawing Sheets

(56) References Cited

U.S. PATENT DOCUMENTS

| | | | |
|---|---|---|---|
| 2004/0236647 A1 | 11/2004 | Acharya | |
| 2005/0177510 A1* | 8/2005 | Hilt | G06Q 20/10 705/40 |
| 2011/0137770 A1 | 6/2011 | Glasco | |
| 2014/0012754 A1* | 1/2014 | Hanson | G06Q 20/042 705/44 |
| 2014/0067661 A1* | 3/2014 | Elischer | G06Q 20/042 705/39 |
| 2014/0229374 A1 | 8/2014 | James | |
| 2014/0236790 A1* | 8/2014 | Smith | G06Q 40/02 705/35 |
| 2016/0328711 A1 | 11/2016 | Elischer | |

OTHER PUBLICATIONS

"U.S. Appl. No. 16/928,077, Non Final Office Action dated Apr. 13, 2022".
"U.S. Appl. No. 16/928,077, Response filed Jul. 13, 2022 to Non Final Office Action dated Apr. 13, 2022", 8 pgs.
"U.S. Appl. No. 16/928,077, Notice of Allowance dated Aug. 2, 2022".
"U.S. Appl. No. 15/898,403, Non Final Office Action dated Jan. 9, 2020", 7 pgs.
"U.S. Appl. No. 15/898,403, Response filed Mar. 31, 2020 to Non Final Office Action dated Jan. 9, 2020", 10 pgs.
"U.S. Appl. No. 15/898,403, Notice of Allowance dated Apr. 16, 2020", 12 pgs.
"U.S. Appl. No. 16/928,077, Supplemental Notice of Allowability dated Nov. 10, 2022".

\* cited by examiner

APPARATUSES AND METHODS FOR GENERATING A UNIFIED DIGITAL CHECK REGISTER

CROSS REFERENCE TO RELATED APPLICATIONS

The present application is a continuation application of U.S. patent application Ser. No. 15/898,403, filed Feb. 16, 2018, which application is hereby incorporated by reference in its entirety.

TECHNOLOGICAL FIELD

Example embodiments of the present invention relate generally to recording financial transactions and, more particularly, to generating a unified digital record of physical and digital checks.

BACKGROUND

Historically, written check registers have been used as physical records of financial transactions and, in this capacity, have served to provide account balance or other financial information to a user. Although there are ubiquitous web-based tools facilitating account balance inquiries, there is an ongoing importance for maintenance of a check register to catalog the allocation of funds towards a check payment during the time in which the check has not yet cleared. Because checks have historically been physically completed by a user and provided to a payee, maintenance of a written check register has been a relatively straightforward process by simply updating the check register at the time the check is written. However, new methods of electronic payment allow a user to complete and transmit checks electronically, and often from varied situations and locations that, as a practical matter, may prevent a user from reliably updating a corresponding written check register. Use of these new payment options may thus result in incomplete records of a user's check transactions, or multiple independent records of a user's check transactions that each have incomplete information.

BRIEF SUMMARY

The challenge of maintaining an up-to-date, complete record of a user's financial information has been made increasingly more difficult in recent years by the growing prevalence of new ways in which to render payment. This challenge has been compounded by an inability of traditional systems to consolidate payment information from multiple payment sources in a practical way. Users are required to update physical check registers to account for checks rendered electronically and/or update digital check registers to account for checks rendered physically. Either way, accurately using these traditional tools requires users to perform additional recordkeeping actions that often detract from the value provided by new tools for electronic transmission of checks. And given the advancement and the sophistication of the various devices used by individuals today, there is now a ubiquity of such new tools enabling the electronic transmission of checks by a user. In addition to identifying a need to resolve these problems that have emerged as a result of the newfound electronic payment systems enabled by modern technology, the inventors have identified that the current increase in the number of user devices and associated modes of connectivity with financial institutions has also created a new opportunity for dynamically reconciling user financial information to account for physically issued checks and digitally issued checks that was historically unavailable.

To solve these issues and harness the new potential associated with electronic/digital payments, example implementations of embodiments of the present invention enable the receipt and storage of both physical check data and digital check data by a single device to facilitate curation of a unified digital check register. Example implementations described herein then may also exchange check status data with an external device (e.g., a banking institution, other user devices, or the like) in order to dynamically modify the unified digital check register in ways that more accurately reflect a user's financial information. In doing so, such example implementations confront and solve the challenges posed by advancement of technology by implementing technical solutions: (1) they provide a physical tool that enables the comprehensive curation of a user's physical checks and digital checks in a single location and (2) they provide new technical features that enable electronic devices to dynamically update the financial information associated with the user.

Systems, apparatuses, methods, and computer program products are disclosed herein for generating a unified digital check register. In one embodiment, with reference to the claimed apparatus, input/output circuitry configured to receive check data is provided. The apparatus may also include check evaluation circuitry configured to determine whether the received check data corresponds to a digital check or a physical check. The apparatus may include digital check circuitry configured to, in response to a determination by the check evaluation circuitry that received check data corresponds to a digital check, generate digital check data based on the received check data. Similarly, the apparatus may include physical check circuitry configured to, in response to a determination by the check evaluation circuitry that received check data corresponds to a physical check, generate physical check data based on the received check data. The apparatus may further include registry management circuitry configured to insert any generated digital check data and any generated physical check data into a unified check dataset and curate a unified digital check register based upon the unified check dataset.

In some embodiments, the input/output circuitry may cause presentation of the unified digital check register to a user.

In some embodiments, the input/output circuitry receive check data corresponding to a digital check via a user input of digital check data provided in response to presentation of a digital check form by the input/output circuitry.

In other embodiments, the input/output circuitry may receive check data corresponding to a physical check via tactile user input on a resistive or capacitive surface of the apparatus.

In some cases, the input/output circuitry may receive check data that corresponds to a digital check and check data that corresponds to a physical check.

In some embodiments, the apparatus may further include communications circuitry configured to transmit at least one of the digital check data or the physical check data to an external device. The communications circuitry, in some further embodiments, may be configured to, in response to transmission of at least one of the digital check data or the physical check data to an external device, receive check status data from the external device.

In some embodiments, the registry management circuitry may be configured to interpret the check status data received from the external device, and modify the unified digital check register based upon the check status data. In such an embodiment, modifying the unified digital check register based on the check status data may include performing reconciliation calculations between one or more data entries of the unified check dataset to modify one or more financial parameters of a user profile associated with the unified digital check register.

In other embodiments, the communications circuitry may transmit a void instruction to the external device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the description may refer to an "apparatus." However, elements of the apparatus described herein may be equally applicable to the claimed method and computer program product. Thus, use of any such terms should not be taken to limit the spirit and scope of embodiments of the present invention.

Overview

Figure 1A:
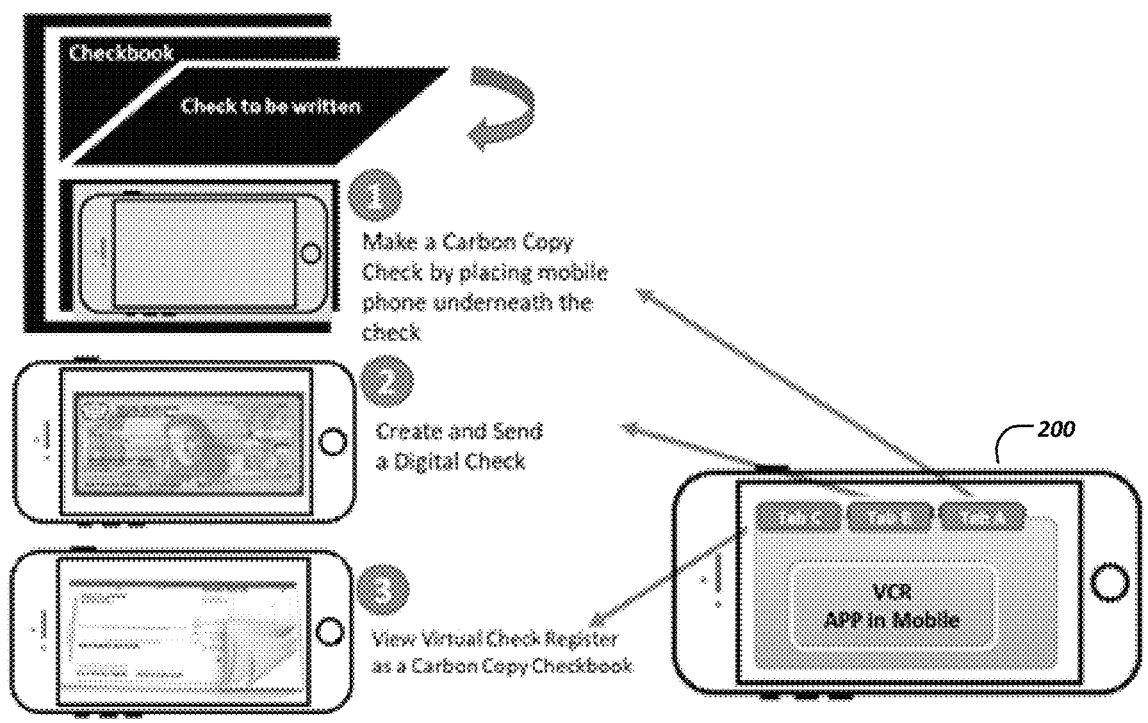
FIG. 1A illustrate photographs of an example device receiving a physical check input and a digital check input.

As noted above, methods, apparatuses, systems, and computer program products are described herein that provide solutions to the problems identified above, as well as others. In one example embodiment, an apparatus (e.g., user device) for generating a unified digital check register is provided that may receive check data in the form of a physical check as shown in FIG. 1A. As described more fully hereafter with reference to FIGS. 3-4, a user may select an option "a" on a touchscreen of the user's device corresponding to a physical check input. The user's device may present a template that resembles a physical carbon copy check in its appearance. The user may position a physical check in contact with the user's device (e.g., a user's smartphone) and, in response to the user writing on the physical check, the user device may collect check data representative of the text written on the physical check and of unique identifying characteristics of the physical check itself. The apparatus may also receive digital check data as shown in FIG. 1A. In particular, as described more fully hereafter, a user may select an option "b" on a touchscreen of the user's device corresponding to a digital check input. The user device may (e.g., via a user request for a digital check or otherwise) render an image of a check and request completion by the user. Through the user's input of the requested information, the user device may collect check data representative of the digital check. Following receipt of check data corresponding to a physical check and/or a digital check, the apparatus (e.g., user device) may combine any collected digital check data with any physical check data to generate a unified digital check register. As illustrated in FIG. 1A, a user may select an option "c" to request presentation of the unified digital check register as described hereinafter. Accordingly, example embodiments thus enable access to a comprehensive representation of the user's financial information in a convenient location through a unified digital check register.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refers to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used herein, the terms "user device," "first user device," "mobile device," "electronic device," and the like refer to computer hardware that is configured (either physically or by execution of software) to access one or more services made available by an external server or computing device (e.g., associated with a corporation, banking entity, or other 3rd party) and, among various other functions, is configured to directly, or indirectly, transmit and receive at least data (e.g., check status data defined hereafter). Example user devices may include a smartphone, a tablet computer, a laptop computer, a wearable device (e.g., smart glasses, smart watch, or the like), and the like. In some embodiments, a user device may include a "smart device" that is equipped with chip of other electronic device that is configured to communicate with the external device via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with an external device (e.g., server or other computing) via a network.

As used herein, the terms "user profile" and "first user profile" may refer to a collection of settings, configurations, identifiers, data, and information associated with a specific user. A user profile configured in accordance with the present invention may be accessible by one or more of software applications that are supported by an external server or computing device (e.g., associated with a corporation, banking entity, or other 3rd party) and, thus, may include application-specific preferences, settings, configurations, data, and information. In some example embodiments, a user profile may include one or more financial parameters modified as based on check status data transmitted and/or received by the user device associated with the user profile.

As used herein, the term "external device" refers to any object, device, or system which may be in network communication with the user device. For example, an external device may be an external server or computing device (e.g., associated with a corporation, banking entity, or other 3rd party) that may request, receive, and/or provide data (e.g., check status data or the like) to or from one of the devices described above. By way of a more particular example, an external device may include a server of a banking entity configured to supply, in response to receipt of digital check data or physical check data, check status data (e.g., comprising account information, transaction history, current balance, clearance indications, or the like) to a user (e.g., transmitted to the user's device) indicating that, for example, a physical check has cleared. In some alternative or additional embodiments, the external device may refer to a user device associated with a second user, second user device, and/or second user profile. By way of example, an external device may include a mobile device of a second user configured to, in response to receipt of digital check data or physical check data, transmit check status data indicating that, for example, a corresponding digital or physical check has been received and deposited by the second user.

As used herein, the term "digital check dataset" refers to a data structure or repository for storing digital check data. By way of example, the digital check dataset may store data corresponding to one or more financial parameters of a digital check received by the user device (e.g., parameters generated from received check data corresponding to a digital check, received from an external device, or the like). The digital check data may be accessible by one or more software applications of the user device and/or external device.

As used herein, the term "physical check dataset" refers to a data structure or repository for storing physical check data. By way of example, the physical check dataset may store data corresponding to one or more financial parameters of a physical check received by the user device (e.g., parameters generated from received check data corresponding to a physical check, or the like). The physical check data may also be accessible by one or more software applications of the user device and/or external device.

As used herein, the term "unified check dataset" refers to a data structure or repository for storing a complete record of all generated physical check data or digital check data corresponding to a particular financial account, entity, user, user device, user profile, or the like, and which is utilized in generating a unified digital check register. By way of example, the unified check dataset may store data corresponding to one or more financial parameters of a physical check and one or more financial parameters a digital check received by the user device. The unified check dataset may be accessible by one or more software applications hosted by the user device and/or external device. Furthermore, the unedified check dataset may be configured to access either of the physical check dataset or digital check dataset directly.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

Figure 1B:
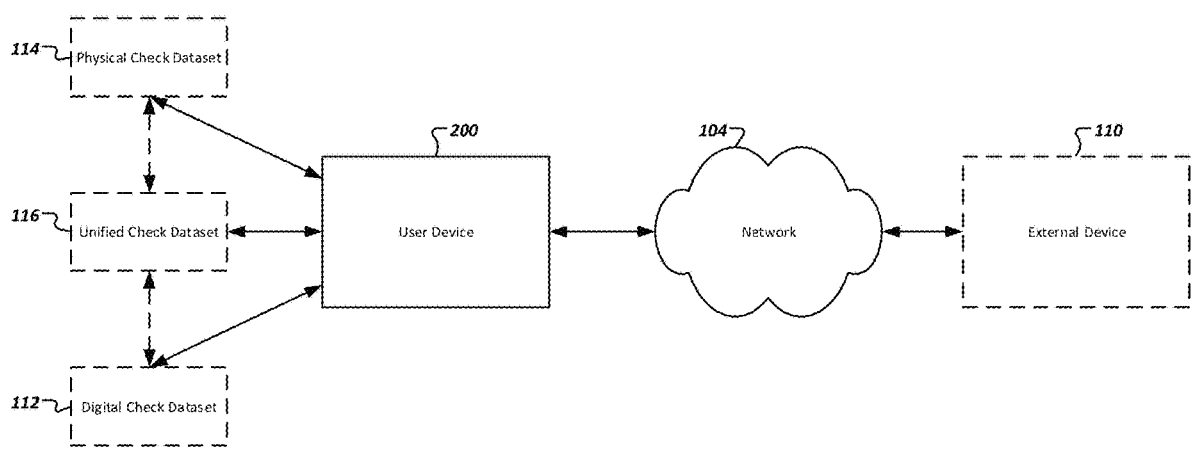
FIG. 1B illustrates a system diagram including devices that may be involved in some example embodiments described herein.

With reference to FIG. 1B, an example system 100 is illustrated with an apparatus (e.g., user device 200) communicably connected with an external device 110 via a network 104. The example system 100 may also include a digital check dataset 112, a physical check dataset 114, and a unified check 116 stored by the user device 200 or by a separate memory in communication with the user device 200.

The user device 200 may include circuitry, networked processors, or the like configured to perform some or all of the apparatus-based (e.g., unified digital check register-based) processes described herein, and may be any suitable network server and/or other type of processing device. In this regard, user device 200 may be embodied by any of a variety of devices. For example, the user device 200 may be configured to receive check data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs, but will nevertheless include at least the components illustrated in FIG. 2 and described in connection therewith. In some embodiments, the user device 200 may be located remotely from the external device 110, the digital check dataset 112, the physical check dataset 114, and/or the unified check dataset 116, although in other embodiments, the user device 200 may comprise the external device 110, the digital check dataset 112, the physical check dataset 114, and/or the unified check dataset 116. The user device 200 may, in some embodiments, comprise several computing devices performing interconnected and/or distributed functions. Despite the many arrangements contemplated herein, the user device 200 is shown and described herein as a single computing device to avoid unnecessarily overcomplicating the disclosure.

The user device 200 may be associated with a first user and a first user profile. Additional user devices (e.g., when the external device 110 is a device of a second user) may be associated with a second user and second user profile. Although only a single user device 200 is illustrated in FIG. 1B, the example system 100 may include any number of user devices that may be associated with the first user profile. As defined above, each user device 200 may be a cellular telephone (e.g., a smartphone and/or other type of mobile telephone), laptop, tablet, electronic reader, e-book device, media device, wearable, smart glasses, smartwatch, or any combination of the above.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The external device 110, as defined above, may be associated with any entity that may be in network communication with the user device 200. For example, the external device 110 may be an external server or computing device (e.g., associated with a corporation, banking entity, or other 3rd party) that may request, receive, and/or provide data (e.g., check status data or the like) to or from the user device 200. By way of a more particular example, the external device 110 may include a server of a bank configured to supply, in response to receipt of digital check data or physical check data transmitted by the user device 200, check status data (e.g., comprising account information, transaction history, current balance, clearance indications, or the like) to the user device 200. In some embodiments, the external device 110 may refer to a user device associated with a second user, second user device, and/or second user profile. By way of example, the external device 110 may include a mobile device of a second user configured to, in response to receipt of digital check data or physical check data transmitted by the user device 200, transmit check status data to the user device 200.

In some embodiments, as described hereinafter, the user device 200 may be configured to receive check data and/or display the received check data (e.g., generated digital check data, generated physical check data, a unified digital check register, or the like). The user device 200 may also allow a user to input commands (such as by writing on a physical check in contact with a touch-sensitive surface of the user device 200), which may be stored in one or more datasets as described above, conveyed to the external device 100 via the network 104, or the like. Check data, such as check data determined to correspond to digital check data, may be generated via one or more input devices including, without limitation, a touchscreen, a microphone, a camera, and/or a motion sensor device (e.g., an accelerometer, gyroscope, etc.).

The digital check dataset 112 may be stored by any suitable storage device configured to store some or all of the information described herein (e.g., memory 204 of the user device 200 or a separate memory system separate from the user device 200, such as one or more database systems, backend data servers, network databases, cloud storage devices, or the like provided by an external device 110 (e.g., a banking entity)). The digital check dataset 112 may comprise data received from the user device 200 (e.g., via a memory 204 and/or processor(s) 202), and the corresponding storage device may thus store this data. The physical check dataset 114 and the unified check dataset 116 may be stored by any suitable storage device in similar fashion as the digital check dataset 112. It will be noted, however, that the physical check dataset 114 and the unified check dataset 116 may be stored by distinct storage devices from the storage device storing the digital check dataset 112, or they may be stored by the same storage devices. To avoid unnecessarily overcomplicating the disclosure, the digital check dataset 112, physical check dataset 114, and the unified check dataset 116 are shown and described using corresponding blocks, despite the fact that they may each be hosted by any number of specific physical devices, together or separately.

Figure 2:
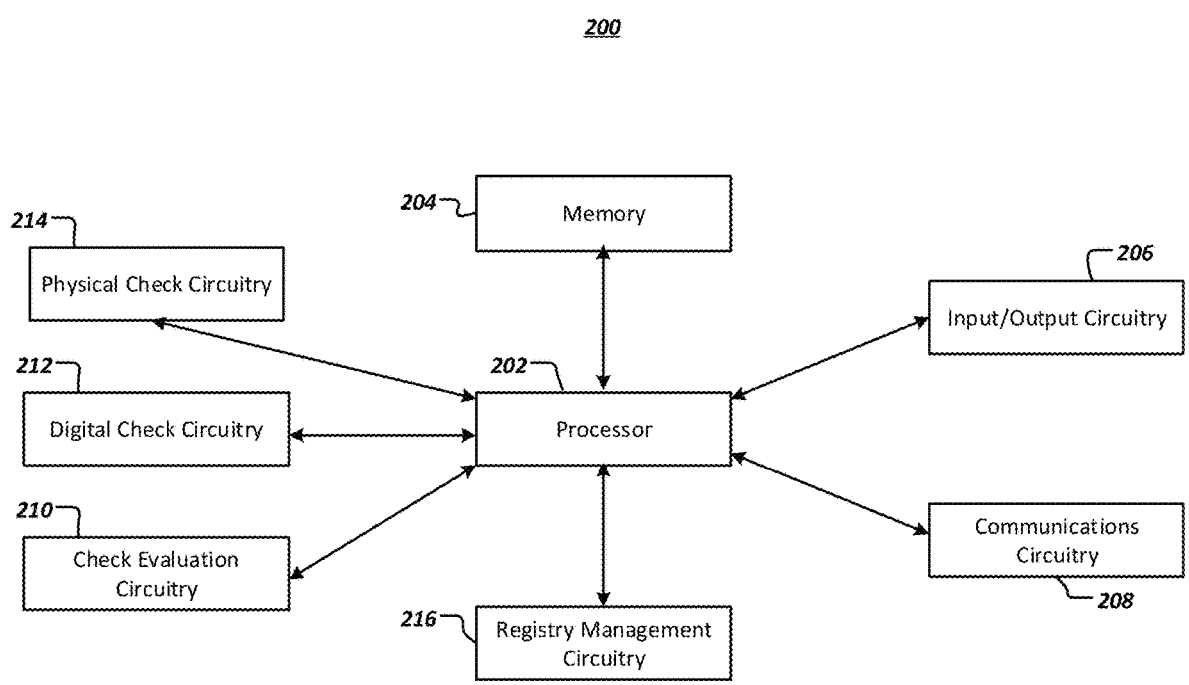
FIG. 2 illustrates a schematic block diagram of example circuitry that may perform various operations in accordance with some example embodiments described herein.

As illustrated in FIG. 2, the user device 200 may include a processor 202, a memory 204, input/output circuitry 206, and communications circuitry 208. Moreover, user device 200 may include check evaluation circuitry 210, digital check circuitry 212, physical check circuitry 214, and registry management circuitry 216. The user device 200 may be configured to execute the operations described below in connection with FIGS. 3-4. Although these components 202-216 are described in some cases using functional language, it should be understood that the particular implementations necessarily include the use of particular hardware. It should also be understood that certain of these components 202-216 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein with respect to components of the user device 200 therefore includes particular hardware configured to perform the functions associated with respective circuitry described herein. As described in the example above, in some embodiments, various elements or components of the circuitry of the user device 200 may be housed within one or more of the user device 200 or the external device 110. As indicated previously, it will be understood in this regard that some of the components described in connection with the user device 200 may be housed within one of these devices, while other components are housed within another of these devices, or by yet another device not expressly illustrated in FIG. 1B.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the user device 200 may provide or supplement the functionality of particular circuitry.

In some embodiments, the processor 202 (and/or coprocessor or any other processing circuitry assisting or otherwise associated with the processor) may be in communication with the memory 204 via a bus for passing information among components of the user device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the user device 200 to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the user device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The user device 200 further includes input/output circuitry 206 that may, in turn, be in communication with the processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of display through computer program instructions (e.g., software and/or firmware) stored on a memory accessible to the processor (e.g., memory 204, and/or the like), such as to the unified digital check register described herein.

In some embodiments, such as shown in FIG. 1A, the input/output circuitry 206 may comprise a touchscreen display configured to contact (e.g., abut, support, be disposed adjacent to, or the like) a physical medium (e.g., a physical check). In such an embodiment, the input/output circuitry 206 may receive check data corresponding to a user's written input on the physical check (e.g., physical check data) by recording (e.g., via a note-taking application, touch areas/features, or the like) the user's markings on the physical medium in contact with the touchscreen display. In some embodiments, this is facilitated through the use of physical paper checks with a special anti-static and conductive material. Such materials provide better electrical conduction, and ensure that a pen/stylus can easily operate the resistive or capacitive touch screen of a mobile through a paper check placed over the mobile's screen.

Most smartphones use capacitive touch screens as opposed to resistive touchscreens. Capacitive touch screens make use of the electrical properties of the human body. A capacitive screen is usually made of one insulating layer, such as glass, which is coated on the inside by a transparent conductive material. Because the human body is conductive (e.g., electricity can pass through it), a capacitive screen uses this conductivity as an input signal, because when one touches a capacitive touchscreen with a finger, one causes a change in the screen's electrical field. When a change of this nature is registered, the location of the touch is determined by a processor. Because capacitive touch screens rely on an electrical change caused by a human skin contact, capacitive touch screens may require a non-static conductive material (e.g., physical paper checks with a special anti-static and conductive material) to cause a change in the electrostatic field of the touch screen when a user is writing on a check placed on top of a capacitive touch screen.

On the other hand, a resistive touchscreen relies on the change of resistance due to the pressure a user applies on the screen. A resistive touchscreen is made out of two thin layers separated by a thin gap. When these two layers of coating touch each other, a voltage is passed, which is in turn processed as a touch in that location. Accordingly, when a finger, stylus, or any other instrument touches a resistive screen, it creates a slight pressure on the top layer, which is then transferred to the adjacent layer to register the touch. Because resistive screens are sensitive to pressure, any physical tool (e.g., a gloved finger, a wooden rod, a fingernail, a stylus, or the like) that creates sufficient pressure on the point of impact of a resistive touchscreen can make the touch interface work. For a computing device 200 having a resistive touch screen, a checkbook made from anti-static and conductive material is not necessary.

In some embodiments, such as shown in FIG. 1A, the input/output circuitry 206 may comprise a touchscreen display configured to render an image of a check with one or more modifiable fields. In such an embodiment, a user may input check data (e.g., digital check data) by modifying the fields displayed on the touchscreen display.

The communications circuitry 208 may be any means such as a device or circuitry embodied in either hardware or a combination of hardware and software that is configured to receive and/or transmit data from/to a network and/or any other device, circuitry, or module in communication with the user device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the user device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Check evaluation circuitry 210 includes hardware components designed to analyze and interpret check data received by the user device 200. The check evaluation circuitry 210 may further include hardware components designed to determine if the check data received by the user device 200 corresponds to a digital check or a physical check. These hardware components may, for instance, utilize elements of the input/output circuitry 206 to receive check data, and the memory 204 to retrieve one or more instructions for evaluating the received check data. Check evaluation circuitry 210 may utilize processing circuitry, such as the processor 202, to perform its corresponding operations, and may utilize memory 204 to store collected information. It will be noted, however, that the functionality of the check evaluation circuitry 210 may, in some embodiments, be performed in whole or in part by the input/output circuitry 206.

Digital check circuitry 212 includes hardware components designed to generate digital check data in an instance in which the check data received by the user device 200 corresponds to a digital check. These hardware components may, for instance, utilize elements of the input/output circuitry 206 to receive check data corresponding to a digital check, and the processor 202 to generate digital check data based upon the received check data. Digital check circuitry 212 may utilize processing circuitry, such as the processor 202, to perform its corresponding operations, and may utilize memory 204 to store collected information.

Physical check circuitry 214 includes hardware components designed to generate physical check data in an instance in which the check data received by the user device 200 corresponds to a physical check. These hardware components may, for instance, utilize elements of the input/output circuitry 206 to receive check data corresponding to a physical check, and the processor 202 to generate physical check data based upon the received check data. Physical check circuitry 212 may utilize processing circuitry, such as the processor 202, to perform its corresponding operations, and may utilize memory 204 to store collected information.

Registry management circuitry 216 includes hardware components designed to combine any check data and generate a unified digital check register based upon the check data received by the user device 200. The registry management circuitry 216 may further include hardware components designed combine any generated digital check data with any generated physical check data to form a unified check dataset and generate a unified digital check register based upon the unified check dataset. These hardware components may, for instance, utilize processing circuitry, such as the processor 202, to perform its corresponding operations, and may utilize memory 204 to store collected information.

It should also be appreciated that, in some embodiments, the check evaluation circuitry 210, digital check circuitry 212, physical check circuitry 214, or registry management circuitry 216 may include a separate processor, specially configured field programmable gate array (FPGA), or application specific interface circuit (ASIC) to perform its corresponding functions.

In addition, computer program instructions and/or other type of code may be loaded onto a computer, processor or other programmable server's circuitry to produce a machine, such that the computer, processor other programmable circuitry that execute the code on the machine create the means for implementing the various functions, including those described in connection with the components of user device 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Generating a Digital Check Register

Figure 3:
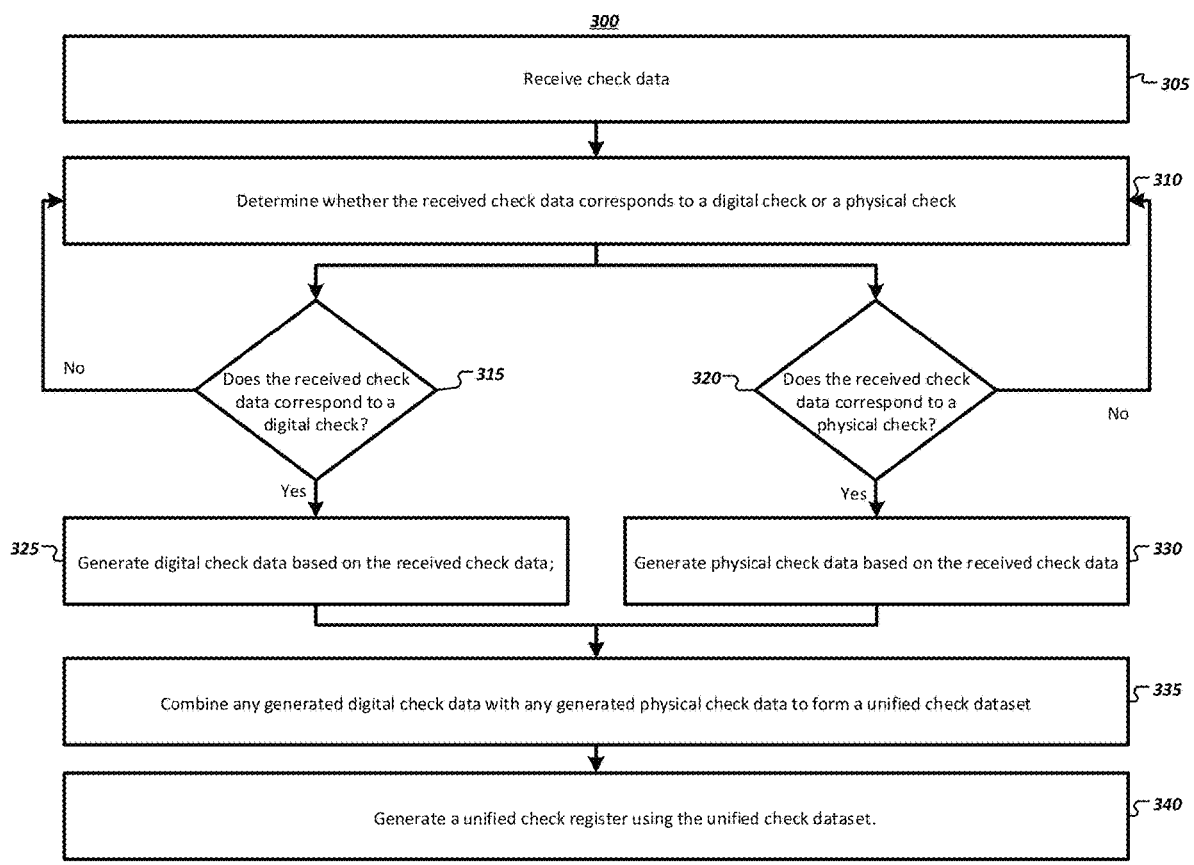
FIG. 3 illustrates an example flowchart for generating a unified digital check register in accordance with some example embodiments described herein.

FIG. 3 illustrates a flowchart containing a series of operations for generating a unified digital check register. The operations illustrated in FIG. 3 may, for example, be performed by, with the assistance of, and/or under the control of an apparatus (e.g., user device 200), as described above. In this regard, performance of the operations may invoke one or more of processor 202, memory 204, input/output circuitry 206, communications circuitry 208, check evaluation circuitry 210, digital check circuitry 212, physical check circuitry 214, and/or registry management circuitry 216.

As shown in operation 305, the apparatus (e.g., user device 200) includes means, such as memory 204, input/output circuitry 206, communications circuitry 208, or the like, for receiving check data. In one embodiment, the user device 200 may simply gather the check data from a local memory 204, in an instance in which the check data was received in a historical operation that occurred previously.

But beyond retrieval of this data from a memory, this check data may be received in near-real-time or substantially in real-time. To this end, in some example embodiments, as described above, the input/output circuitry 206 may receive check data corresponding to a physical check via a written user input on a physical medium located in contact with the user device 200. By way of example and as shown in FIG. 1A, the input/output circuitry 206 of the user device 200 may define a resistive or capacitive touchscreen or other responsive display surface configured to contact a physical medium (e.g., a physical check). In such an embodiment, as a user writes on the physical medium in contact with the touchscreen display, the user device 200 may include a note-taking application, text recognition application, or the like that operates to identify the physically-inputted check data. In some embodiments, the physical medium (e.g., a user's checkbook and physical checks) may be dimensioned (e.g., sized and shaped) to compliment or substantially align with display defined by the user device 200.

Furthermore, depending on the nature of the input/output circuitry 206 (i.e., whether the input/output circuitry 206 comprises a capacitive or resistive surface), the physical medium may comprise an anti-static and/or conductive material such that contact between the physical medium (e.g., physical check) and the touchscreen display is recognizable by the input/output circuitry 206. As is evident by the examples described herein, a physical check comprising an anti-static and/or conductive material may be operationally required to facilitate collection of check data corresponding to a physical check. Still further, in some embodiments, the input/output circuitry 206 may be configured for use with only an appropriate input device (e.g., ink pen or the like).

In some example embodiments, as described above, the input/output circuitry may receive check data corresponding to a digital check via a user input of check data on a digital check form generated by the user device 200. By way of example and as shown in FIG. 1A, the input/output circuitry 206 may (e.g., via a user request or automatically) display or otherwise render a digital check form for viewing by a user. In such an embodiment, one or more fields (e.g., payee, date, check amount, etc.) defined by the digital check form may be modifiable by a user. For example, the digital check form may request that a user input a check amount via a touchscreen display. In some embodiments, once each field is modified to include the appropriate check data and confirmed by an associated user, the digital check form may lock to prevent further modification of the check data. In this way, the digital check form may prevent fraud or unauthorized tampering with a user's check data.

In some other example embodiments, with continued reference to operation 305, the user device 200 may receive, by communication circuitry 208, check data corresponding to a digital check. As shown in FIG. 1B, the user device 200 may be communicably connected with one or more external devices 110 via network 104. By way of example, the external device 110 may transmit check data corresponding to a digital check (e.g., direct deposits, account refunds, or the like) to the user device 200 without action by the user of the user device 200. For instance, the user device 200 may dynamically receive check data from a banking entity via automatic or direct deposits into an account associated with the user, user profile, and/or user device 200. In other embodiments, the external device 110 may correspond to a second user device associated with a second user. By way of example, a second user device (e.g., unrelated to the first user device) may transmit check data corresponding to a digital check to the user device 200. In particular, various mobile payment applications allow check data to be directly transferred between mobile devices. In this way, another, second user device may transmit check data to the user device 200. While the description herein references transmission of check data corresponding to a digital check directly between the user device 200 and one or more external devices 110, the present disclosure contemplates that any number of intermediary devices (e.g., banking server, third-party payment application, etc.) may also be used.

Thereafter, as shown in operation 310, the apparatus (e.g., user device 200) includes means, such as processor 202, check evaluation circuitry 210, or the like, for determining whether the received check data corresponds to a digital check or a physical check. By way of example, the check evaluation circuitry 210 may analyze all check data and appropriately group or otherwise sort the check data into check data that corresponds to a digital check or a physical check. As is evident by the examples described herein, for example, in an instance in which a written input to a physical medium in contact with the user device 200 occurs, the check evaluation circuitry 210 may determine that the check data corresponds to a physical check. Similarly, for example, in an instance in which a digital form is presented to a user or check data is received without a written input to a physical medium, the check evaluation circuitry 210 may determine that the check data corresponds to a digital check. The determination performed by check evaluation circuitry 210 may, therefore, be informed by the functions performed by the user device 200 during each iteration of collecting the check data.

As shown in operations 315 and 325, the apparatus (e.g., user device 200) includes means, such as digital check circuitry 212, or the like, for, in response to determining that the received check data corresponds to a digital check, generating digital check data based on the received check data. By way of example, the digital check circuitry 212 may receive check data, determined to correspond to a digital check by the check evaluation circuitry 210, and may generate digital check data based upon this check data. In one such example, the digital check circuitry 212 may analyze received check data that corresponds to various financial parameters of a digital check, described more fully with reference to FIG. 5, and may order or otherwise group this check data to generate digital check data. As described above with reference to FIG. 1B, the digital check data may, in some embodiments, be stored in part or in whole in the digital check dataset 112.

As shown in operations 320 and 330, the apparatus (e.g., user device 200) includes means, such as processor 202, memory 204, input/output circuitry 206, physical check circuitry 214, or the like, for, in response to determining that the received check data corresponds to a physical check, generate physical check data based on the received check data. By way of example, the physical check circuitry 214 may receive check data, determined to correspond to a physical check by the check evaluation circuitry 210, and may generate physical check data based upon this check data. In one such example, the physical check circuitry 214 may analyze received check data that corresponds to various financial parameters of a physical check, described more fully with reference to FIG. 4, and may order or otherwise group this check data to generate physical check data. As described above with reference to FIG. 1B, the physical check data may, in some embodiments, be stored in part or in whole in the physical check dataset 114.

While described above with reference to separate circuitry (e.g., digital check circuitry 212 and physical check circuitry 214) generating only respective check data (e.g., digital check data or physical check data), the present disclosure contemplates that in many embodiments, the check data received at operation 305 may include both digital checks and physical check data. For instance, a user may, via input/output circuitry 206, input check data that corresponds to a digital check and, subsequently, may input check data that corresponds to a physical check, or vice versa. In this fashion, such embodiments of the present disclosure enable both digital check data and physical check data to be received by the user device 200. Furthermore, in some embodiments, a portion of the check data received by the input/output circuitry 206 for a particular check may correspond to a digital check while another portion of the check data for the same check may correspond to a physical check. By way of example, a user may attempt to input check data corresponding to a physical check via writing on a physical medium in contact with the user device 200. During input, however, the physical medium (e.g., the check itself) may tear, smear, etc. such that a portion of the check data is unclear or has not yet been entered. In such a case, the user device 200 may prompt the user to input check data corresponding to a digital check to confirm or supplement the previously received check data corresponding to a physical check. In this way, the user device 200 may simultaneously (e.g., in a single transaction) receive check data that corresponds to both a physical check and a digital check.

Figure 5:
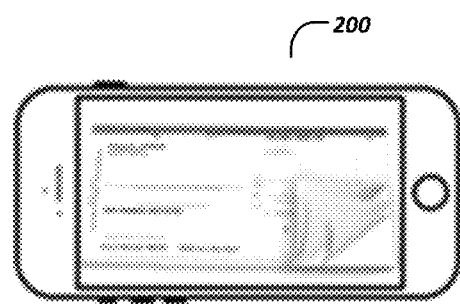
FIG. 5 illustrates a photograph of an example device presenting the unified digital check register in accordance with some example embodiments described herein.

Thereafter, as shown in operations 335 and 340, the apparatus (e.g., user device 200) includes means, such as registry management circuitry 216, or the like, for inserting any generated digital check data with any generated physical check data into a unified check dataset and for curating a unified digital check register using the unified check dataset. By way of example, the registry management circuitry 216 may query each of the digital check dataset 112 and the physical check dataset 114 for generated digital check data or generated physical check data, respectively. Thereafter, the registry management circuitry 216 may combine any responsive digital check data and physical check data into a single dataset representative of all checks transmitted, received, inputted, or the like by the user and associated user device 200. The registry management circuitry may then generate and/or update a unified digital check register based on the unified check dataset. The unified digital check register may, in some embodiments, be presented to a user subsequently by the input/output circuitry 206 (or may be transmitted via communication circuitry 208 for presentation to a user via a separate device). As shown in FIG. 5, described hereinafter, the unified digital check register may thus be provided as a graphical representation including not only the digital checks issued by the user, but also the physical checks issued by the user.

Figure 4:
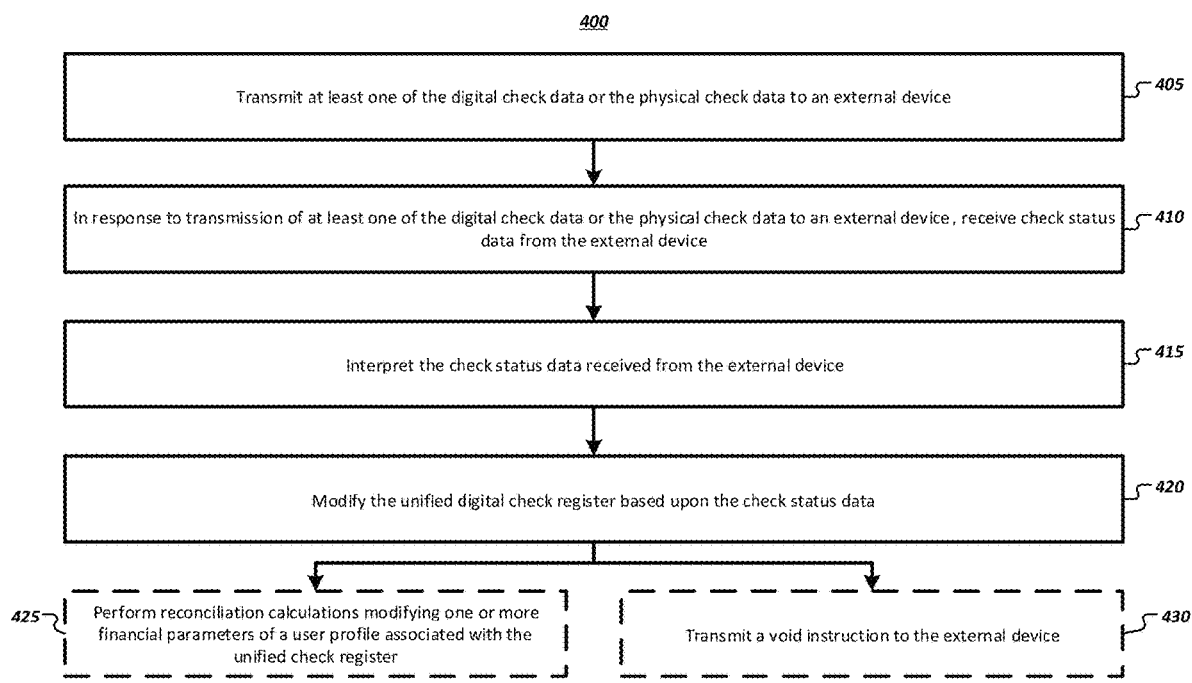
FIG. 4 illustrates an example flowchart for modifying the unified digital check register in accordance with some example embodiments described herein.

The registry management circuitry 216, in combining any generated digital check data and any generated physical check data to generate a unified digital check register, may identify one or more financial parameters, described more fully with reference to FIG. 4, of a user profile associated with each data entry in the unified check dataset. Furthermore, the unified digital check register may represent an ordered or grouped presentation of the digital checks and physical checks of the user. By way of example, in some embodiments, the registry management circuitry 216 may determine a check date for each digital check and physical check of the user and may organize these checks in a chronologically ordered, unified set. Furthermore, in some embodiments, the unified digital check register may present a current balance for the user based upon a reconciliation of the digital checks and the physical checks received by the user device 200. While described in detail with reference to FIG. 4 hereafter, each generated digital check data entry and generated physical check data entry may include a corresponding check amount. Accordingly, the registry management circuitry 216 may sum the check amounts for each entry to determine a current balance, outstanding check amount, or other financial parameters as described below.

Turning next to FIG. 4, a flowchart is shown that describes example embodiments for modifying the unified digital check register. The operations illustrated in FIG. 4 may, for example, be performed by, with the assistance of, and/or under the control of an apparatus (e.g., user device 200), as described above. In this regard, performance of the operations may invoke one or more of processor 202, memory 204, input/output circuitry 206, communications circuitry 208, check evaluation circuitry 210, digital check circuitry 212, physical check circuitry 214, and/or registry management circuitry 216.

In operation 405, the apparatus (e.g., user device 200) includes means, such as communications circuitry 208, or the like, for transmitting at least one of the digital check data or the physical check data to an external device. By way of example, and as is required by the nature of check clearing services, the user device 200 may, in some embodiments, transmit received check data (e.g., digital or physical) to an external device 110 in communication with the user device 200. By way of a more particular example, a user may input check data that corresponds to a physical check as described above with reference to FIG. 3. The user device 200 may transmit the generated physical check data to a banking entity (e.g., the external device 110) in order to effectuate the clearance cycle and cause transmission of funds from a first financial account to a second.

Thereafter, as shown in operation 410, the apparatus (e.g., user device 200) includes means, such as input/output circuitry 206, communications circuitry 208, or the like, for, in response to transmission of at least one of the digital check data or the physical check data to an external device, receiving a check status data from the external device 110. By way of continued example, upon receipt of the transmitted physical check data at operation 405, the banking entity (e.g., external device 110) may provide a pending alert (e.g., checking status data) to the user device 200. The checking status data described herein may refer to any status information (e.g., current balance, pending payment, insufficient funds, or the like) that may be relevant to performance of the check clearing process. As illustrated in FIG. 5, the unified digital check register may, in some embodiments, display the checking status data associated with each entry (e.g., each check) in the unified digital check register.

Thereafter, as shown in operation 415, the apparatus (e.g., user device 200) includes means, such as registry management circuitry 216, or the like, for interpreting the check status data received from the external device. As described above with reference to operation 410, the check status data may refer to any status information that may be user to modify or inform the unified digital check register. In this way, the registry management circuitry 216 may interpret the data provided by the banking entity (e.g., external device 110) and determine which unified digital check register data entry is modified by the check status data and the manner by which the entry should be modified. As in traditional, written check books, the checking status data may, in some embodiments, define a corresponding check number such that the checking status data may be properly grouped with the corresponding entry.

Thereafter, as shown in operation 420, the apparatus (e.g., user device 200) includes means, such as registry management circuitry 216, or the like, for modifying the unified check register based upon the check status data. By way of example, once the check status data is properly grouped with its corresponding entry in the unified digital check register, the corresponding entry may be modified in light of the check status data. For example, and as shown in operation 425, the apparatus (e.g., user device 200) may include means, such as processor 202, registry management circuitry 216, or the like, for performing reconciliation calculations modifying one or more financial parameters of a user profile associated with the unified check register. By way of continued example, the check status data received from the banking entity (e.g., external device 110) in response to the transmitted physical check data may indicate that the check has cleared. In this way, the check status data may modify the current balance (e.g., financial parameter) of the user's bank account (e.g., user profile) by reconciling this cleared check in the account's current balance. While described herein with reference to check status data indicative of a cleared check, the present disclosure contemplates that the check status data may include any known checking operation (e.g., lack of funds, check not presented, expired, not cleared, or the like). Similarly, the present disclosure reference a user's account balance as a representative financial parameter. The present disclosure, however, contemplates that the one or more financial parameters as claimed may encompass any known feature, parameter, element, or the like of the user's bank account (e.g., user profile). For example, the one or more financial parameters may refer to a value in outstanding checks, number of physical checks remaining, debt-to-income ratio, or the like.

In some embodiments, as shown in operation 430, the apparatus (e.g., user device 200) may include means, such as processor 202, memory 204, input/output circuitry 206, communications circuitry 208, registry management circuitry 216, or the like, for transmitting a void instruction to the external device 110. By way of example, in some embodiments, a user may determine that a previously issued physical or digital check should no longer be processed (e.g., the transactional terms effectuated) by the banking entity (e.g., external device 110). In some instances, the user's account information may be comprised such that the user and associated user device wish to stop unauthorized access to his or her account. In other instances, a user may determine that insufficient funds (e.g., financial parameter) are present in his or her account to clear a previously issued check. Accordingly, the user may transmit a void instruction to stop payment on transmitted digital check data or physical check data. As illustrated by the example embodiment of FIG. 4, the financial information of a user may be dynamically updated by the inventions described herein.

Turning next to FIG. 5, a photograph of an example device presenting the unified digital check register is illustrated. As shown, the apparatus (e.g., user device 200) includes means, such as processor 202, memory 204, communications circuitry 208, input/output circuitry 206, or the like, for causing presentation of the unified digital check register to a user. As described above, the user device 200 may include a touchscreen or other display configured to render or otherwise present the unified digital check register. For the sake of convenience and user comfort, the unified digital check register may resemble a traditional carbon-copy check book in digital form. In some embodiments, the displayed unified digital check register may similarly resemble a physical checkbook by providing a page turn effect in which a user input (e.g., moving from either bottom corner of the screen in an upward fashion) causes the displayed unified digital check register to flip pages to illustrate subsequent checks, physical or digital.

As described above, various technical challenges are surmounted via technical solutions contemplated herein. For instance, example embodiments described herein enable the curation of a comprehensive unified check register comprising information about all of a user's physical and digital checks in a single location. Example embodiments further facilitate dynamically updating the financial information stored in the unified check register, and provide new tools for managing clearance of both physical and digital checks. By providing physical tools that enable the comprehensive curation of a user's physical checks and digital checks in a single location and new technical features that enable electronic devices to dynamically update the financial information associated with the user, example implementations of the present invention thus confront and solve the technical challenges posed by the increasingly complex payment ecosystem permitted by the ubiquity of mobile device power and interconnectivity.

FIGS. 3-4 illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of a user device 200 and may be executed by various circuitry components of the user device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for generating a unified digital check register, the apparatus comprising:
input/output circuitry configured to receive check data;
check evaluation circuitry configured to determine whether received check data corresponds to a digital check or a physical check;
digital check circuitry configured to, in response to a determination by the check evaluation circuitry that a first portion of the received check data corresponds to a digital check, generate digital check data in a first data structure of a first data structure type based on transforming the received check data to the first data structure;
physical check circuitry configured to, in response to a determination by the check evaluation circuitry that a second portion of the received check data corresponds to a physical check, generate physical check data in a second data structure of a second data structure type based on transforming the received check data to the second data structure; and
registry management circuitry configured to:
generate a unified digital check register including the digital check data stored in the first data structure and the physical check data stored in the second data structure, the unified digital check register configured to access the first data structure and the second data structure; and
modify the first data structure or the second data structure of the unified digital check register based on information received from an external device related to the received check data.

2. The apparatus according to claim 1, wherein the input/output circuitry is further configured to cause presentation of the unified digital check register to a user.

3. The apparatus according to claim 1, wherein the input/output circuitry is configured to receive check data corresponding to a digital check via a user input of digital check data provided in response to presentation of a digital check form by the input/output circuitry.

4. The apparatus according to claim 1, wherein the input/output circuitry is configured to receive check data corresponding to a physical check via tactile user input on a resistive or capacitive surface of the apparatus.

5. The apparatus according to claim 1, wherein the registry management circuitry is further configured to modify the unified digital check register by performing reconciliation calculations between one or more data entries of the unified check dataset to modify one or more financial parameters of a user profile associated with the unified digital check register.

6. A method for generating a unified digital check register, the method comprising:
receiving, by input/output circuitry; check data;
determining, by check evaluation circuitry, whether the received check data corresponds to a digital check or a physical check;
in response to determining that a first portion of the received check data corresponds to a digital check, generating, by digital check circuitry, digital check data in a first data structure of a first data structure type based on transforming the received check data to the first data structure;
in response to determining that a second portion of the received check data corresponds to a physical check, generating, by physical check circuitry, physical check data in a second data structure of a second data structure type based on transforming the received check data to the second data structure;
generate, by the registry management circuitry, a unified digital check register including the digital check data stored in the first data structure and the physical check data stored in the second data structure, the unified digital check register configured to access the first data structure and the second data structure; and
modify, by the registry management circuitry, the first data structure or the second data structure of the unified digital check register based on information received from an external device related to the received check data.

7. The method according to claim 6, further comprising causing, by the input/output circuitry, presentation of the unified digital check register to a user.

8. The method according to claim 6, wherein receiving check data corresponding to a digital check comprises:
receiving user input of digital check data provided in response to presentation of a digital check form by the input/output circuitry, or
receiving digital check data from an external device.

9. The method according to claim 6, wherein receiving check data corresponding to a physical check comprises receiving a tactile user input on a resistive or capacitive surface of the apparatus.

10. The method according to claim 9, wherein receiving a tactile user input on a capacitive surface further comprises a tactile user input on a physical medium received by the capacitive surface comprised of an anti-static and conductive material.

11. The method according to claim 6, further comprising modifying the unified digital check register by performing reconciliation calculations modifying one or more financial parameters of a user profile associated with the unified digital check register.

12. The method of claim 6, further comprising transmitting a void instruction to an external device.

13. A non-transitory computer-readable storage medium for using an apparatus to generate a unified digital check register, the non-transitory computer-readable storage medium storing instructions that, when executed, cause the apparatus to:
receive check data;
determine whether the received check data corresponds to a digital check or a physical check;
in response to determining that a first portion of the received check data corresponds to a digital check, generate digital check data in a first data structure of a first data structure type based on transforming the received check data to the first data structure;

in response to determining that a second portion of the received check data corresponds to a physical check; generate physical check data in a second data structure of a second data structure type based on transforming the received check data to the second data structure;

generate a unified digital check register including the digital check data stored in the first data structure and the physical check data stored in the second data structure, the unified digital check register configured to access the first data structure and the second data structure; and modify the first data structure or the second data structure of the unified digital check register based on information received from an external device related to the received check data.

14. The non-transitory computer-readable storage medium according to claim 13, further comprising instructions that, when executed, cause the apparatus to cause presentation of the unified digital check register to a user.

15. The non-transitory computer-readable storage medium according to claim 13, wherein receiving check data corresponding to a digital check comprises:

receiving user input of digital check data provided in response to presentation of a digital check form by the input/output circuitry, or receiving digital check data from an external device.

16. The non-transitory computer-readable storage medium according to claim 13, wherein receiving check data corresponding to a physical check comprises receiving a tactile user input on a resistive or capacitive surface of the apparatus.

17. The non-transitory computer-readable storage medium according to claim 13, further comprising instructions that, when executed, cause the apparatus to transmit at least one of the digital check data or the physical check data to an external device.

18. The non-transitory computer-readable storage medium according to claim 13, further comprising instructions that, when executed, cause the apparatus to transmit a void instruction to an external device.

19. The method according to claim 1, wherein the first data structure type and the second data structure type differ by at least one parameter corresponding to a digital check and a physical check, respectively.

* * * * *